(12) United States Patent
De Blois

(10) Patent No.: US 7,374,681 B2
(45) Date of Patent: May 20, 2008

(54) BIOLOGICAL DEOXYGENATION METHOD AND USES THEREOF

(75) Inventor: Michel De Blois, Saint-Laurent Ile d'Orléans (CA)

(73) Assignee: Ecologiq, LLC, Troy, MI (US)

( * ) Notice: Subject to any disclaimer, the term of this patent is extended or adjusted under 35 U.S.C. 154(b) by 0 days.

(21) Appl. No.: 11/299,610

(22) Filed: Dec. 12, 2005

(65) Prior Publication Data

US 2006/0151386 A1 Jul. 13, 2006

Related U.S. Application Data

(63) Continuation of application No. PCT/CA2004/000863, filed on Jun. 10, 2004.

(60) Provisional application No. 60/477,023, filed on Jun. 10, 2003.

(51) Int. Cl.
*C02F 3/34* (2006.01)
(52) U.S. Cl. ....................... 210/601; 210/931
(58) Field of Classification Search ............... 210/601, 210/243, 254.2, 254.21, 931; 435/243, 254.2, 435/254.21; 252/175; 424/93.1, 93.5, 93.51
See application file for complete search history.

(56) References Cited

U.S. PATENT DOCUMENTS

| | | | |
|---|---|---|---|
| 4,510,162 A | | 4/1985 | Nezat |
| 4,996,073 A | * | 2/1991 | Copeland et al. ............ 426/487 |
| 5,106,633 A | * | 4/1992 | Edens et al. .................... 426/8 |
| 5,298,264 A | | 3/1994 | Edens et al. |
| 5,334,533 A | * | 8/1994 | Colasito et al. ............. 435/264 |
| 5,376,282 A | * | 12/1994 | Chang ......................... 210/750 |
| 5,525,132 A | * | 6/1996 | Shanmuganathan ...... 424/93.51 |
| 5,932,112 A | | 8/1999 | Browning, Jr. |
| 5,962,045 A | * | 10/1999 | Rubelmann et al. ........... 426/8 |
| 6,171,508 B1 | * | 1/2001 | Browning, Jr. ............. 210/750 |
| 6,221,262 B1 | | 4/2001 | MacDonald et al. |
| 6,267,888 B1 | * | 7/2001 | Satyanarayana ............ 210/610 |
| 6,348,639 B1 | * | 2/2002 | Crawford et al. ......... 435/262.5 |
| 2005/0087117 A1 | * | 4/2005 | Scott et al. .................. 114/222 |

OTHER PUBLICATIONS

U.S. Congress, Office of Technology Assessment, "Bioremediation for Marine Oil Spills-Background Paper", OTA-BP-O-70 (Washington, DC: U.S. Government Printing Office, May 1991).*
Kirin Brewery, Patent Abstracts of Japan, vol. 009, No. 233 (C-304), Sep. 19, 1985: JP 60 090096 A; May 21, 1985.
Tamburri, Mario N. et al.; Biological Conservation; 103:331-341 (2002).

* cited by examiner

*Primary Examiner*—Fred G. Prince
(74) *Attorney, Agent, or Firm*—Nixon Peabody LLP

(57) ABSTRACT

The present invention relates to a composition and a method for reducing the level of oxygen, preferably dissolved oxygen in an aqueous environment. The composition comprises deoxygenating microorganisms that, when growing, consume the oxygen that is present in the environment. The effect of reducing the oxygen level in the environment causes the death or inhibition of other undesired living organisms, prokaryotes as well as eukaryotes.

7 Claims, 4 Drawing Sheets

|   |   |   |     | 0,5  | 1    | 2    | 3    | 4    | 8    | 9    | 16  |
|---|---|---|-----|------|------|------|------|------|------|------|-----|
| 1 | 0 | 0 | 8,8 | 8,6  | 8,4  | 9    | 9,8  | 10,4 | 9,9  | 10,5 | 10  |
| 2 | 1 | 0 | 8,8 | 8,5  | 8,6  | 8,5  | 8,6  | 8,2  | 7    | 7    | 7,3 |
| 3 | 2 | 0 | 8,8 | 8,3  | 8    | 6,6  | 6    | 5,1  | 3,1  | 3,7  | 3,4 |
| 4 | 0 | 0,1 | 8,8 | 8,8 | 8,6 | 8,7 | 9,6 | 9,9 | 10   | 10,3 | 9,9 |
| 5 | 1 | 0,1 | 8,8 | 8,5 | 8,3 | 7,4 | 6,9 | 5,7 | 1,7  | 1,1  | 2   |
| 6 | 2 | 0,1 | 8,8 | 8,4 | 7,9 | 5,4 | 4,5 | 4   | 0,8  | 0,5  | 1   |
| 7 | 0 | 0,2 | 8,8 | 8,7 | 8,6 | 8,6 | 9,8 | 10,3 | 10,1 | 10,2 | 9,7 |
| 8 | 1 | 0,2 | 8,8 | 8,4 | 8,3 | 7,3 | 6,8 | 5,8 | 1,6  | 0,9  | 0   |
| 9 | 2 | 0,2 | 8,8 | 8,2 | 7,5 | 4,8 | 4,4 | 3,7 | 0,6  | 0,5  | 0   |
| 19 | 2 | 0,01 | 8,8 | 8,8 | 8,1 | 7 | 7 | 6 | 1,5 | 0,7 | 0 |
| 20 | 2 | 0,02 | 8,8 | 8,6 | 8,3 | 7 | 5,7 | 3,5 | 0,6 | 0,4 | 0 |

|    |   |    |      | 0,25 | 4    | 12   | 16   | 20   | 25   | 35   |
|----|---|----|------|------|------|------|------|------|------|------|
| 10 | 0 | 0  | 18,5 | 17,8 | 16,3 | 14,8 | 15,3 | 15,7 | 15,6 | 12,8 |
| 11 | 1 | 0  | 18,5 | 18,4 | 14,3 | 14   | 12,6 | 11,6 | 11   | 9,2  |
| 12 | 2 | 0  | 18,5 | 18,4 | 13,3 | 10,7 | 8,1  | 7,4  | 6,7  | 5,7  |
| 13 | 0 | 10 | 18,5 | 18,3 | 15,1 | 15   | 15   | 14,6 | 14,2 | 13   |
| 14 | 1 | 10 | 18,5 | 18,2 | 13,3 | 8,5  | 7,7  | 6,9  | 6,1  | 4,4  |
| 15 | 2 | 10 | 18,5 | 17,6 | 10,1 | 5,7  | 4,1  | 3,2  | 2,5  | 3,1  |
| 16 | 0 | 20 | 18,5 | 18,2 | 14,7 | 14,7 | 14,8 | 15   | 15,4 | 13   |
| 17 | 1 | 20 | 18,5 | 18   | 12,3 | 11   | 10,3 | 7,4  | 6,3  | 5,6  |
| 18 | 2 | 20 | 18,5 | 17,9 | 10,3 | 8,1  | 7,1  | 4,3  | 3,5  | 3,8  |

|   |      |      | 1,5  | 4,5  | 6,5  | 16,25 | 21   | 24,5 |
|---|------|------|------|------|------|-------|------|------|
| 0 | 0    | 15,5 | 15   | 12,6 | 11,6 | 12    | 9,2  | 9,3  |
| 1 | 0    | 15,5 | 12,5 | 10,7 | 9,2  | 8,3   | 6,5  | 4,5  |
| 2 | 0    | 15,5 | 12,5 | 9,2  | 6,7  | 5,6   | 5,8  | 4,5  |
| 0 | 0,01 | 15,5 | 14,4 | 13,3 | 12,4 | 11,2  | 9,5  | 9,3  |
| 1 | 0,01 | 15,5 | 12,4 | 9,5  | 8,6  | 6,5   | 5,3  | 3,4  |
| 2 | 0,01 | 15,5 | 12,1 | 7,3  | 5,7  | 3,6   | 2,4  | 1,8  |
| 0 | 0,02 | 15,5 | 14,4 | 13,2 | 12   | 11,3  | 10,2 | 9,7  |
| 1 | 0,02 | 15,5 | 13,5 | 9,5  | 8,2  | 5,6   | 3,7  | 2,4  |
| 2 | 0,02 | 15,5 | 11,4 | 6,9  | 3,8  | 2,9   | 1,9  | 1,1  |

Fig. 3

BIOLOGICAL DEOXYGENATION METHOD AND USES THEREOF

CROSS REFERENCE TO RELATED APPLICATIONS

This application is a continuation of international application PCT/CA2004/000863 filed Jun. 10, 2004 and claims priority on U.S. provisional application 60/477,023 filed Jun. 10, 2003, the entire content of both applications being hereby incorporated by reference.

BACKGROUND OF THE INVENTION a) Technical Field

The present invention relates to the field of treating water containing potentially undesirable living organisms, and more particularly to a composition and a method for treating ship ballast water to kill or eliminate harmful prokaryotic or eukaryotic aquatic organisms.

b) Background Art

It has long been recognized that invasions by non-native aquatic species are increasingly common worldwide in coastal habitats. Transportation and introduction of non-indigenous species in ship ballast water has created substantial economic and environmental impact throughout the world. Global shipping, which moves 80% of the world's commodities and is fundamental to world trade, inadvertently transports many aquatic organisms.

Ballast water transport of alien species has been determined in several countries to be a national environmental conservation issue of the highest priority. For example, zebra mussels, toxic dinoflagellates, stinging jellyfish, and numerous fish and invertebrate species have all been transported into new habitats via ship ballast water. These introductions have caused broad environmental impact, have had tremendous economic impacts in remedial actions, and have focused government legislators on the development of controls that will have serious ramifications to both commercial and military shipping.

While filtration of the ballast water may seem to be a logical solution, the volume and rate of filtration (to 25,000 cubic meters/hr), coupled with occasional heavy silt loads, make this option difficult to achieve. Other methods, including the use of biocides, ozonation, ultraviolet treatment, chemical deoxygenation, magnetic fields and sonication, have been tested, each with operational or economic shortcomings.

For example, tests conducted on the use of biocides and herbicides show that the treatment of ballast water with these agents would both be expensive and cause unpredictable pollution and destruction to the local ecological environment upon discharge of the treated ballast. Further, it has been found that when sub-optimal concentrations of the biocides and herbicides are used, the numbers of organisms in the ballast water may actually increase.

Heat sterilization of ballast water with steam or engine heat would also be expensive and also has the problem of causing accelerated corrosion due to the increased ballast water temperature.

The current best technology for attempting to cure the problem of transporting undesirable organisms is to require ships to exchange, in mid-ocean or on the high seas, the original local ballast water with the saline, open ocean sea water. However, such an exchange of ballast water on the high seas is potentially extremely hazardous, especially, for large cargo ships and tankers, and in any event has been shown not to be fully effective in removing all microorganisms and higher living organisms from a ship's hold.

This mid-ocean ballast exchange is usually (but not always) safe when the space in which the water is being exchanged is small enough so as not to create a dangerous instability or structural stress condition during the water-pumping process for effecting the exchange; for example, such a ballast exchange usually (but not always) is safe when dealing with specialized ballast tanks or other similar small spaces because of the low ratio of the weight of the involved water with the overall weight of the ship, and because of the ability of the load bearing strength of the ship to accommodate a temporarily empty "small" specialized ballast tank.

However, it is often required that cargo holds or large ballast tanks be filled with water so that the ship's center of gravity is lowered during a voyage when no cargo is carried. Under these conditions, one or more cargo holds or tanks are often filled with ballast water. Because these holds or tanks contain very large spaces, they must be kept either completely full or completely empty so that interior wave action does not develop. Thus, if ballast exchange were attempted from such a large space and the ship encountered heavy seas in the middle of the pumping process, then there could develop inside the space a wave action which could destabilize the ship and create a very dangerous condition.

One relatively recent approach that has been proposed to reduce introduction or propagation of undesirable organisms in ship ballast water is deoxygenating by nitrogenous treatment. While reduction of survivorship of organisms and microorganisms is observed in ship ballast, there is always need of important sources of nitrogen on the ships. The system generating the necessary nitrogen is money and energy consuming, without considering the important time needed for maintenance of the systems. The arrangements that must be taken to meet the normative security rules are also often very constraining.

In considering the state of the art mentioned above, it is still highly desirable to be provided with new approaches for control of unwanted biological material in transportation and relocation of large volumes of water.

DISCLOSURE OF INVENTION

One aspect of the present invention is to provide a method for avoiding undesired living organisms, such as by growth or proliferation, as well as partial or total killing, which comprises adding to the aqueous environment a sufficient quantity of deoxygenating microorganisms to reduce the oxygen, including dissolved oxygen, level in the aqueous environment to a growth inhibitory or lethal level to the living organisms.

The undesired living organisms can be an eukaryote, such as mussels, prokaryotes, microorganisms or an algae. The undesired living organisms that can be avoided by treatment with the composition and method of the present invention can include adherent or invasive organisms that are present in an aqueous environment, which is normally contained in a tank or a container.

The aqueous environment can be fresh or salt water.

According to the method of the present invention, when deoxygenating microorganisms, such as yeast are added to an aqueous environment, the addition may be carried out previously or concomitantly with a carbon source, such as, but not limited to, sugar, serving as a growth stimulant to the yeast.

A large number of species of yeast can be selected to perform the deoxygenation of an aqueous environment, thereby allowing inhibition or elimination of living organisms therein. For example, but without restriction, a yeast from the genus *Rodotorula* or *Saccharomyces* can be used.

Another aspect of the present invention is to provide a composition comprising deoxygenating microorganisms capable of reducing the oxygen level in an aqueous environment to a level that is lethal or growth inhibiting to other undesired living or potentially living organisms.

Also, there is provided a method for reducing the concentration of oxygen in a aqueous environment comprising adding thereto deoxygenating microorganisms, such as yeast.

Again, yeast is added in sufficient quantity to reduce the concentration of oxygen in said aqueous environment to a level that is lethal to most aquatic living organisms In accordance with the present invention, there is also provided a composition for reducing the dissolved oxygen level in a aqueous medium comprising yeast.

Another aspect of the present invention resides in use of yeast in the preparation of a composition for reducing dissolved oxygen level in an aqueous medium.

DESCRIPTION OF THE DRAWINGS

FIG. 3 illustrates the deoxygenating rate of water from different sources at different temperatures.

MODES OF CARRYING OUT THE INVENTION

Figure 1:
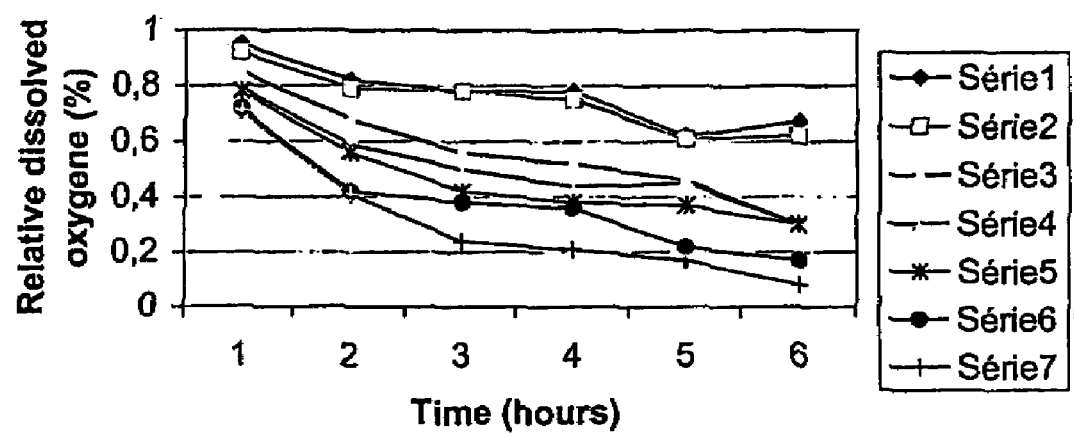
FIG. 1 illustrates the deoxygenating rate of fresh water after addition of yeasts.

The present invention will now be described more fully hereinafter with reference to the accompanying drawings, in which preferred embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

In accordance with the present invention, there is provided a composition and a method for reducing the oxygen level, preferably the dissolved oxygen level, in an aqueous environment, more particularly water. The present invention also provides a composition comprising yeast cells, which when added to an aqueous environment, grow by consuming the oxygen available to other elements in the environment up until the oxygen level is significantly reduced. In fact, it has been observed that the oxygen, preferably dissolved oxygen concentrations of liquids in which microorganisms such as yeast were added and allowed to grow were reduced to a level that is lethal to almost all aerobic living organisms. The removal of dissolved oxygen by the yeast that is present in the environment causes the death of a majority of aquatic organisms that live or grow in this environment. Also, the lethal level of dissolved oxygen will prevent other organisms or microorganisms from invading the environment. For example, but without restriction thereto, this can be easily accomplished in a ship ballast.

To perform the method of the present invention, yeast cells are simply added to an aqueous medium to be deoxygenated. After a short period of time, the level of dissolved oxygen in the medium is significantly reduced because of its consumption by the yeast cells.

One important embodiment of the present invention is that different types of microorganisms including any yeast species can be used to activate the deoxygenating process in the aqueous environment. Additionally, the deoxygenation according to the present invention can be performed at different temperatures, varying from −1.5° C. to 95° C., but preferably between 0° C. and 40° C. Another outstanding aspect of the invention is that the method of deoxygenating can be carried out in fresh water as well as in salt water, such as sea water.

Thus, in a first aspect, the present invention provides a method for reducing the number of viable or living organisms that are present in ship ballast water comprising treating the ballast water so as to reduce the concentration of oxygen therein and to increase carbon dioxide to a level(s) at which a substantial portion of the organisms present cease to remain viable.

The expression "substantial portion" means that at least 50% of the organisms present in ballast water cease to remain viable during or following the treatment according to the invention. It is, however, preferred that at least 70%, more preferably 95%, of the organisms present in ballast water cease to remain viable following treatment. "Organisms" is to be understood as including animals and plants and single and multicellular microorganisms. Thus, the kinds of organisms that might be destroyed by the method of the invention include, but are not limited to, fish, starfish, crabs, shrimps, bacteria (e.g. cholera, typhoid), dinoflagellates, pest flora species (e.g. Japanese kelp) and various algal blooms (e.g. red algal bloom, blue/green algal bloom) which are commonly found in ballast water.

Preferably, the concentration of dissolved oxygen is reduced to less than 1 ppm, or lower. Most preferably, the concentration of dissolved oxygen is reduced to 0.1 ppm, which ensures that the number of viable organisms after about 48 hours becomes negligible.

Yeast cells have been found to reduce the dissolved oxygen and increase carbon dioxide to the required levels.

According to one embodiment of the present invention, yeast may be added to the aqueous medium to be treated with a suspension agent(s). Such suspension agents have been found to keep yeast in suspension longer, which can assist in the reduction of dissolved oxygen concentrations.

The rate at which deoxygenation is achieved to reduce the number of viable organisms to a desired level, may depend on the amount of yeast added, the suspension agent, the temperature and the degree of suspension and mixing. These parameters may be tailored to suit cost and performance requirements.

Another primary and broad object of the invention is to provide a method and apparatus by which large amounts of water, including ship ballast water, is treated in a cost-effective and time-effective manner to kill nearly all of the aerobic microorganisms and organisms that are present in ballast water. Such large amounts would be, for example only, 40,000 to 60,000 tons of ballast water which is typical for 150,000 ton (DWT) bulk carrier to be carried for stability, and which would require treatment over a period of days.

Another object of the present invention is to provide such a method and apparatus which efficiently and inexpensively reduce the level of oxygen in ship ballast water to a point where substantially the majority, if not all, of the aerobic microorganisms and higher living organisms are killed, so that the treated ballast water can safely be discharged into coastal waters even when it originates from an ecologically different coastal zone.

It will be recognized by those skilled in the art to which the present invention pertains, that living organisms, mostly microorganisms, which can live in a latent state, such as spores, and which temporarily needs oxygen or high levels of oxygen to keep their development potential, can be inhibited from differentiating and/or developing in an aqueous environment that is treated by the method according to the present invention Also, the deoxygenating microorganisms, bacteria, fungi or yeast among others, can remain living or partly living while maintaining the oxygen concentration in an aqueous medium at a level that is lethal or growth inhibiting to other organisms and microorganisms. One embodiment of the present invention is that this may occur without killing all or a proportion of the deoxygenating microorganisms.

The deoxygenating process using the composition and method of the present invention can be performed in a short period of time, for example for cleaning needs in an aqueous medium or a tank or any type of water containing reservoir. Alternatively, the deoxygenating process can last as long as it is desired for maintaining the quantity of undesired organisms in an aqueous environment, such as all along a ship travel.

The present invention will be more readily understood by referring to the following examples which are given to illustrate the invention rather than to limit its scope.

EXAMPLE I

Assessment of Deoxygenating Rate in Fresh Water

Yeast was added to fresh water at between 12° C. to 15° C.

Results are shown in FIG. 1 where dissolved oxygen levels in fresh water are significantly reduced over time.

EXAMPLE II

Assessment of Deoxygenating Rate in Salt Water

Yeast was added to salt water at 12-15° C.

Figure 2:
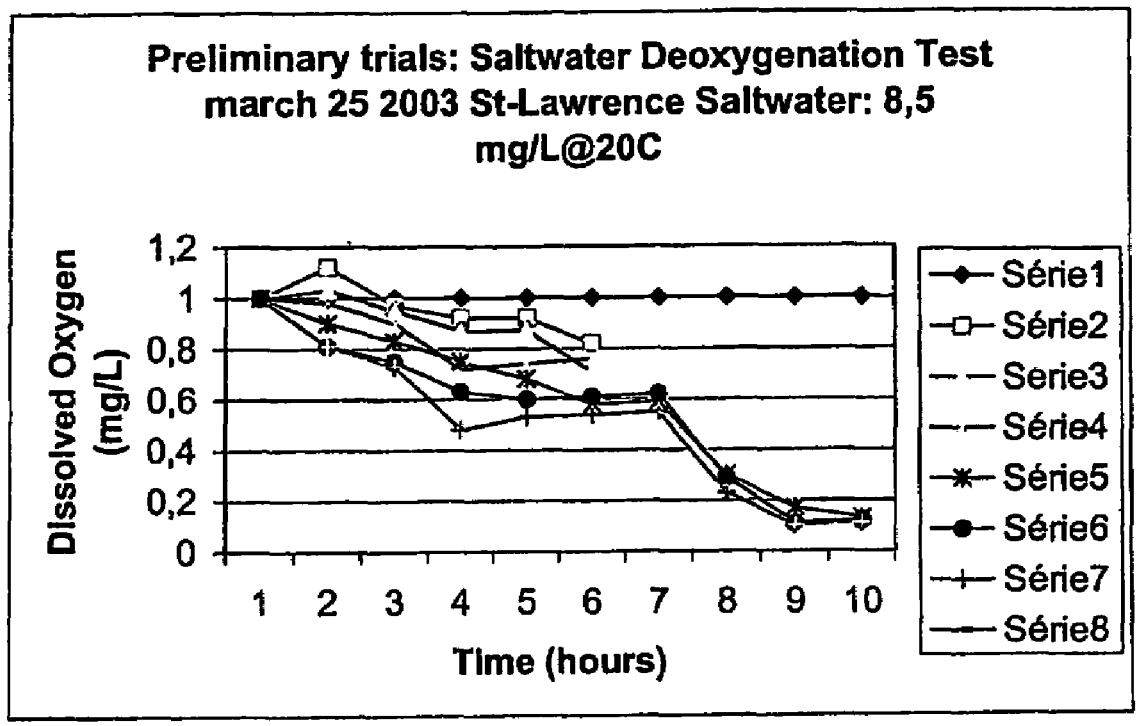
FIG. 2 illustrates the deoxygenating rate of sea water after addition of yeasts.

Results are shown in FIG. 2 where dissolved oxygen levels in salt water are significantly reduced over time.

EXAMPLE III

Assessment of Deoxygenating Rate in Water of Different Sources

Yeast was added to distilled fresh water at 18° C. and at between 6° C. to 9° C., in crude natural water from the St. Lawrence river.

Figure 4:
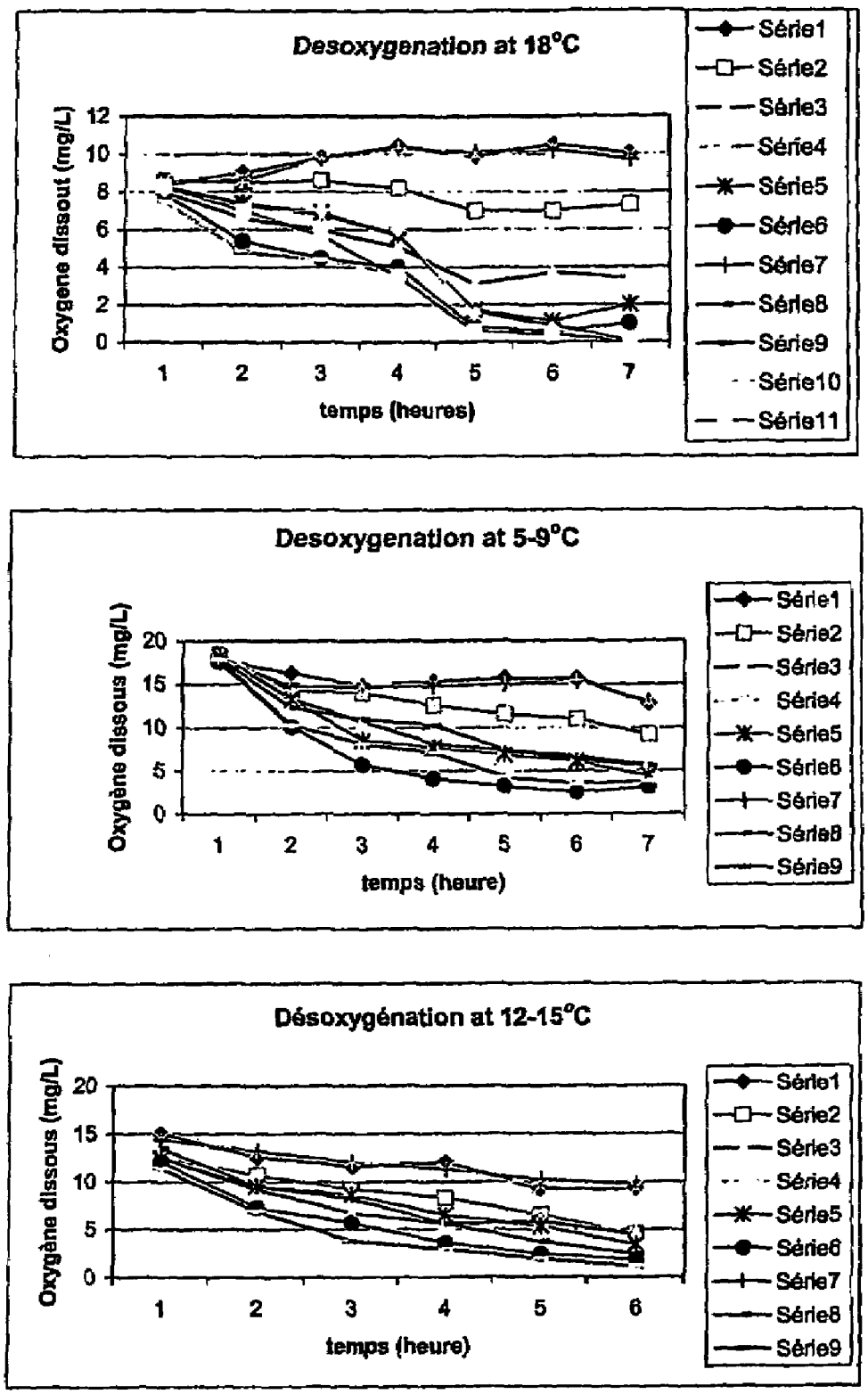
FIG. 4 illustrates the deoxygenating rate of water at different temperature.

Data are shown in FIG. 3 with graphs in FIG. 4, where dissolved oxygen levels in water of different sources and at different temperatures are significantly reduced.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

The invention claimed is:

1. A method for avoiding living organisms in a ship's ballast water which comprises adding to said water, deoxygenating yeasts in a quantity that is sufficient to grow and thereby reduce the oxygen level in said ballast water to a growth inhibitory or lethal level for said living organisms, wherein said yeast is of *Rhodotorula* species.

2. The method of claim 1, wherein said living organisms are microorganisms or an algae.

3. The method of claim 1, wherein said living organisms are mussels.

4. The method of claim 1, wherein said living organisms are adherent organisms.

5. The method of claim 1, wherein said oxygen is dissolved in said water.

6. The method of claim 1, wherein said water is fresh water or salt water.

7. The method of claim 1, wherein said oxygen level is substantially eliminated.

* * * * *